United States Patent
Ishii et al.

(10) Patent No.: US 11,029,637 B2
(45) Date of Patent: Jun. 8, 2021

(54) POSITIONING STRUCTURE BETWEEN SHEET FEEDER AND IMAGE FORMING APPARATUS TO BE INSTALLED ONTO TOP OF THE SHEET FEEDER

(71) Applicant: KYOCERA Document Solutions Inc., Osaka (JP)

(72) Inventors: Akira Ishii, Osaka (JP); Masayuki Yamada, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/004,212

(22) Filed: Aug. 27, 2020

(65) Prior Publication Data

US 2021/0062840 A1    Mar. 4, 2021

(30) Foreign Application Priority Data

Aug. 28, 2019 (JP) .............................. JP2019-155929

(51) Int. Cl.
| | |
|---|---|
| *G03G 21/16* | (2006.01) |
| *G03G 15/00* | (2006.01) |
| *F16B 7/00* | (2006.01) |
| *B65H 1/00* | (2006.01) |

(52) U.S. Cl.
CPC ..... *G03G 21/1647* (2013.01); *G03G 15/6502* (2013.01); *B65H 1/00* (2013.01); *F16B 7/00* (2013.01); *G03G 15/6529* (2013.01)

(58) Field of Classification Search
CPC .............. G03G 21/16; G03G 21/1638; G03G 21/1642; G03G 21/1647; G03G 15/65; G03G 15/6502; G03G 15/6511; G03G 2221/1678; G03G 2221/1684
See application file for complete search history.

(56) References Cited

U.S. PATENT DOCUMENTS

| | | | | |
|---|---|---|---|---|
| 5,666,595 | A * | 9/1997 | Sameshima ............ | G03G 15/00 24/658 |
| 2005/0100362 | A1* | 5/2005 | Kim ....................... | G03G 15/50 399/107 |
| 2013/0195503 | A1* | 8/2013 | Nakagaki ........... | G03G 21/1619 399/107 |
| 2014/0001696 | A1* | 1/2014 | Yoshida ................. | G03G 21/16 271/9.01 |
| 2017/0060077 | A1* | 3/2017 | Yamaguchi ............ | B65H 1/266 |
| 2017/0108818 | A1* | 4/2017 | Hashimoto ........ | G03G 21/1647 |
| 2017/0343947 | A1* | 11/2017 | Hozono ............. | G03G 15/6502 |

FOREIGN PATENT DOCUMENTS

JP          2000-138470           5/2000

* cited by examiner

*Primary Examiner* — Thomas S Giampaolo, II
(74) *Attorney, Agent, or Firm* — Wenderoth, Lind & Ponack, L.L.P.

(57) ABSTRACT

A positioning structure includes a positioning aiding member attached to a horizontal beam of a sheet feeder and having a positioning hole formed at an opposed portion thereof opposed to the horizontal beam. The positioning aiding member has a guide part that, when an image forming apparatus is installed onto a top of the sheet feeder, guides a horizontal beam of the image forming apparatus such that a positioning hole formed in a lower surface of the horizontal beam of the image forming apparatus approaches a first positioning pin coupled with the positioning aiding member as viewed in an extending direction of the horizontal beam of the sheet feeder.

5 Claims, 12 Drawing Sheets

POSITIONING STRUCTURE BETWEEN SHEET FEEDER AND IMAGE FORMING APPARATUS TO BE INSTALLED ONTO TOP OF THE SHEET FEEDER

CROSS-REFERENCE TO RELATED APPLICATION(S)

This application is based upon and claims the benefit of priority from Japanese Patent Application No. 2019-155929 filed on Aug. 28, 2019, the entire contents of which are incorporated herein by reference.

BACKGROUND

The technology disclosed herein relates to a positioning structure between a sheet feeder and an image forming apparatus to be installed onto the top of the sheet feeder.

There are cases where a sheet feeder as an optional device is additionally attached to an image forming apparatus such as a printer or a multifunction peripheral. In such a case, the image forming apparatus is placed onto the top of the sheet feeder. If there is a deviation in the position of the sheet feeder relative to the image forming apparatus, failures such as a sheet jam can occur during a sheet feeding operation.

To solve this problem, a positioning structure has been proposed which is configured such that a pair of positioning pins are provided on a top surface of a skeleton frame of the sheet feeder and the positioning pins are respectively engaged with positioning holes formed in a bottom surface of a skeleton frame of the image forming apparatus.

SUMMARY

An aspect of the present disclosure is directed to a positioning structure between a sheet feeder and an image forming apparatus to be installed onto a top of the sheet feeder.

In the positioning structure, the image forming apparatus has a skeleton frame including a horizontal beam at a lower end thereof, and the horizontal beam has a positioning hole formed in a lower surface thereof. The sheet feeder has a skeleton frame including a horizontal beam at an upper end thereof, and the horizontal beam has a positioning hole formed in an upper surface thereof.

The positioning structure includes a positioning aiding member, a first positioning pin, and a second positioning pin. The positioning aiding member is attached to the horizontal beam of the sheet feeder. The positioning aiding member has a positioning hole formed at an opposed portion thereof opposed to the horizontal beam of the sheet feeder. The first positioning pin is coupled with the positioning aiding member and is configured to engage with the positioning hole formed in the horizontal beam of the image forming apparatus. The second positioning pin is fitted in both the positioning hole formed in the horizontal beam of the sheet feeder and the positioning hole of the positioning aiding member to position the positioning aiding member relative to the horizontal beam of the sheet feeder. The positioning aiding member has a guide part. When the image forming apparatus is installed onto the top of the sheet feeder, the guide part guides the horizontal beam of the image forming apparatus such that the positioning hole formed in the lower surface of the horizontal beam of the image forming apparatus approaches the first positioning pin coupled with the positioning aiding member as viewed in an extending direction of the horizontal beam of the sheet feeder.

DETAILED DESCRIPTION

Hereinafter, an example embodiment of the present disclosure will be described in detail on the basis of the drawings. It should be understood that the technology disclosed herein is not limited to the embodiment described below.

Embodiment

Figure 1:
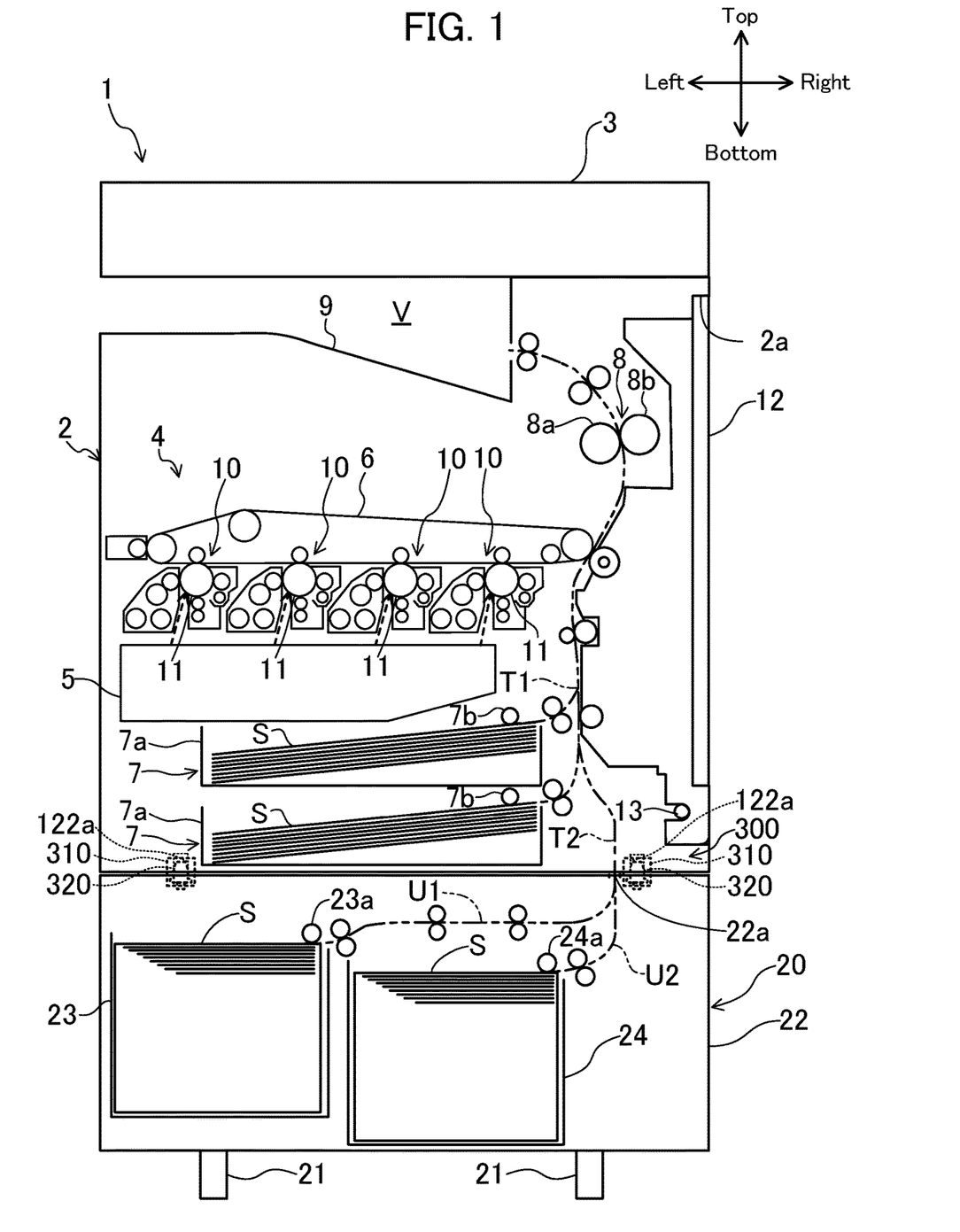
FIG. 1 is a schematic diagram illustrating inner structures of an image forming apparatus and an optional sheet feeder that are positioned by a positioning structure according to an embodiment of the present disclosure.

FIG. 1 is a schematic diagram illustrating an image forming apparatus 1 and an optional sheet feeder 20 that are positioned by a positioning structure 300 according to an embodiment of the present disclosure. The optional sheet feeder 20 has four casters 21 on a bottom surface thereof and is installed on a floor. The image forming apparatus 1 is placed on the top of the optional sheet feeder 20. The image forming apparatus 1 is positioned in the front-rear direction and the left-right direction relative to the optional sheet feeder 20 by the positioning structure 300. Note that the terms "front", "rear", "left", and "right" in the following description are defined with respect to the image forming apparatus 1 and conform to the directional axis definition shown in the figures.

[Configuration of Image Forming Apparatus 1]

The image forming apparatus 1 is composed of, for example, an in-body sheet discharge type copying machine and includes an image forming apparatus body 2 and an image reader 3 provided on the top of the image forming apparatus body 2. The image reader 3 optically reads an image of a document and generates image data of the document.

The image forming apparatus body 2 has therein an image forming part 4 that forms an image on a sheet S by transfer on the basis of the image data generated by the image reader 3. An exposure device 5 that radiates a laser beam is arranged below the image forming part 4. A transfer belt 6 is arranged above the image forming part 4. Two sheet feeders 7 are arranged one on another below the exposure device 5. The optional sheet feeder 20, which is described later, is arranged below the lower sheet feeder 7. A fixing unit 8 that performs a fixing process on the image formed on the sheet S is arranged at a higher position than the transfer belt 6 at the right side of the transfer belt 6. A sheet discharge space V into which the sheet S subjected to the fixing process by the fixing unit 8 is discharged is provided between the image forming apparatus body 2 and the image reader 3. A sheet discharge tray 9 that receives the sheet S discharged into the sheet discharge space V is formed on a top surface of the image forming apparatus body 2.

The image forming apparatus body 2 has therein a sheet conveying path T1 and an optional conveying path T2. The sheet conveying path T1 extends from the sheet feeders 7 toward the sheet discharge tray 9, and the optional conveying path T2 extends from the optional sheet feeder 20 and joins the sheet conveying path T1. Each sheet feeder 7 has a sheet feed cassette 7a that is configured to be able to be pulled out to the front side. Each sheet feed cassette 7a contains sheets S (composed of, for example, paper sheets, OHP sheets, or any other type of sheets) stacked in a bundle. Each sheet feeder 7 picks up an uppermost one of the sheets S one by one with a pick-up roller 7b and sequentially feeds the picked-up sheets S to the sheet conveying path T1.

The image forming part 4 includes four image forming units 10 that respectively correspond to four colors of yellow, magenta, cyan, and black. Each image forming unit 10 includes a photosensitive drum 11. In each image forming unit 10, an electrostatic latent image that is formed on the photosensitive drum 11 by the exposure device 5 is developed by a developing device so that the electrostatic latent image is visualized as a toner image of the corresponding color. The image forming part 4 sequentially transfers the toner images from the photosensitive drums 11 of the image forming units 10 onto the transfer belt 6 such that the toner images are superimposed one on another, and then transfers the superimposed toner images onto a sheet S fed from the sheet feeders 7 or the optional sheet feeder 20.

The fixing unit 8 includes a heat roller 8a and a pressure roller 8b. The fixing unit 8 heats and presses the toner images carried on the sheet S fed from the image forming part 4 while the sheet S passes between the rollers 8a and 8b, whereby the toner images are heat-fixed on the sheet S. The sheet S subjected to this heat-fixing process is discharged onto the sheet discharge tray 9.

The image forming apparatus body 2 has a rectangular opening 2a formed in a right side surface thereof that adjoins the sheet conveying path T1 and the optional conveying path T2. The opening 2a is able to be opened and closed by an openable cover 12. The openable cover 12 is turnably supported on a shaft 13 extending along a lower edge of the opening 2a. The openable cover 12 in the closed state is brought into the opened state by turning to the outer side of the image forming apparatus body 2 (the right side in FIG. 1) about the shaft 13. Bringing the openable cover 12 into the opened state allows a user to deal with a sheet jammed in the sheet conveying path T1 or the optional conveying path T2.

[Configuration of Optional Sheet Feeder 20]

The optional sheet feeder 20 is externally attached to a bottom surface of the image forming apparatus 1. The optional sheet feeder 20 has a casing 22 that has the four casters 21 on a bottom surface thereof. The casing 22 is formed by covering the faces of a skeleton frame 200 assembled in a substantially rectangular parallelepiped shape (see FIG. 4) with an outer cover made of resign. The casing 22 houses a pair of sheet feed cassettes 23, 24 that are arranged side by side in the left-right direction such that they are able to be pulled out to the front side. Each sheet feed cassette 23, 24 contains sheets S stacked in a bundle. The capacity of each sheet feed cassette 23, 24 is set to be greater than that of each sheet feed cassette 7a included as standard in the image forming apparatus 1, so that the sheet feed cassettes 23, 24 are available also for a business purpose that requires mass printing.

The casing 22 has a sheet outlet 22a formed in a right end portion of a top surface thereof. The casing 22 has therein a first sheet conveying path U1 and a second sheet conveying path U2 that respectively extend from the sheet feed cassettes 23 and 24 to the sheet outlet 22a. The sheet conveying paths U1 and U2 join together at the sheet outlet 22a and connect to the optional conveying path T2 in the image forming apparatus 1. The optional sheet feeder 20 picks up an uppermost one of the sheets S contained in each sheet feed cassette 23, 24 one by one with each pick-up roller 23a, 24a and sequentially feeds the picked-up sheets S to the optional conveying path T2 in the image forming apparatus body 2 through each sheet conveying path U1, U2 and the sheet outlet 22a.

Figure 2:
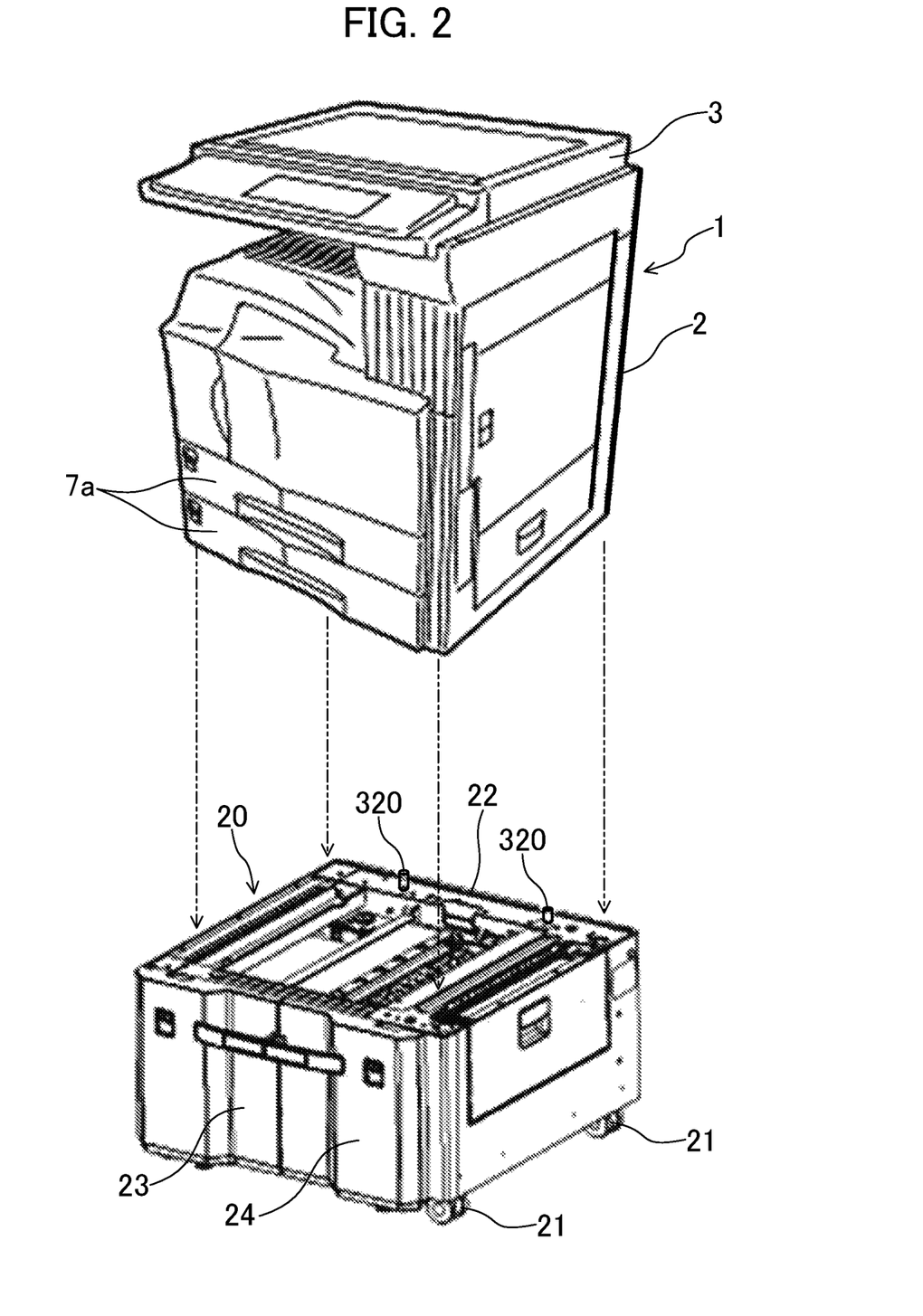
FIG. 2 is a perspective view illustrating the image forming apparatus and the optional sheet feeder separately.

As shown in FIG. 2, the optional sheet feeder 20 is able to be separated from the image forming apparatus 1. The image forming apparatus 1 is, as described above, installed on a top surface of the optional sheet feeder 20. If the position of installation of the image forming apparatus 1 deviates from a predetermined position, a jam can occur during the sheet feeding operation performed by the optional sheet feeder 20, which halts the sheet feeding operation. To prevent such a failure, the image forming apparatus 1 and the optional sheet feeder 20 are positioned relative to each other by the positioning structure 300.

In this positioning structure 300, a pair of left and right pin members 320 are provided to protrude from the top surface of the optional sheet feeder 20. The pin members 320 are respectively engaged with positioning holes 122a formed in the bottom surface of the image forming apparatus 1 so that positional relation in the front-rear direction and the left-right direction between the image forming apparatus 1 and the optional sheet feeder 20 is regulated.

In the conventional positioning structure, when an operator lifts up the image forming apparatus 1 to install it onto the top surface of the optional sheet feeder 20, the operator is not able to see the positioning holes 122a formed in the bottom surface of the image forming apparatus 1. Therefore, the operator has to rely on his/her own intuition to align the image forming apparatus 1 and the optional sheet feeder 20, and therefore has difficulty in the alignment.

In contrast, the positioning structure 300 according to this embodiment facilitates the alignment by attaching a positioning aiding member 310 to the skeleton frame 200 of the optional sheet feeder 20. Prior to describing details of the positioning aiding member 310, a structure of a skeleton frame 100 of the image forming apparatus 1 and a structure of the skeleton frame 200 of the optional sheet feeder 20 are schematically described.

Figure 3:
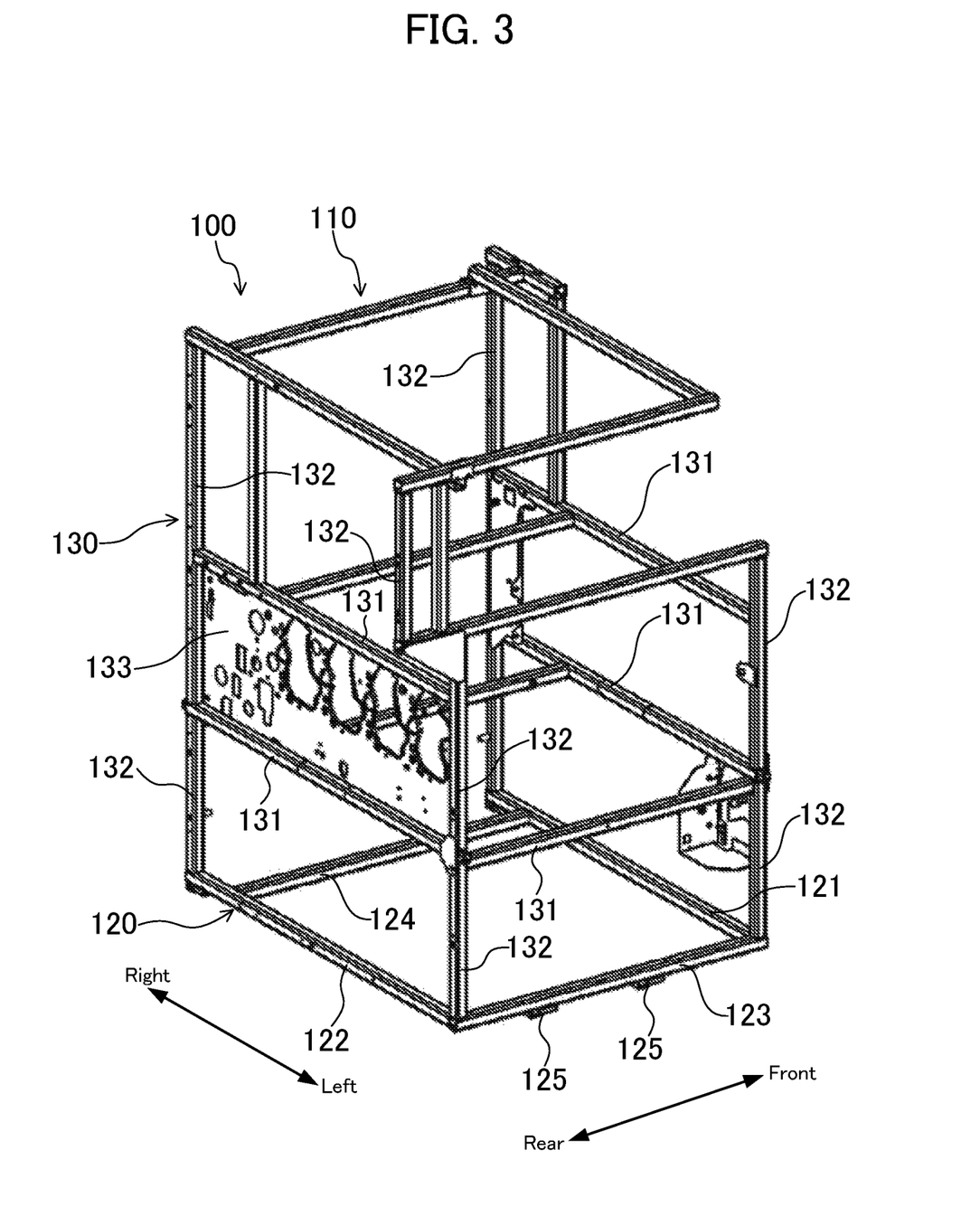
FIG. 3 is a perspective view illustrating a skeleton frame of the image forming apparatus.

As shown in FIG. 3, the skeleton frame 100 of the image forming apparatus 1 is formed by fitting together pipes (example of horizontal beam) having a rectangular cross section. Specifically, the skeleton frame 100 has an upper end frame part 110, a lower end frame part 120, and an intermediate frame part 130. The upper end frame part 110 and the lower end frame part 120 are each formed in a rectangular shape extending in the left-right direction. The upper face of the upper end frame part 110 constitutes a face on which the image reader 3 is mounted. The lower face of the lower end frame part 120 constitutes a face to be joined to the skeleton frame 200 of the optional sheet feeder 20. The intermediate frame part 130 is formed in a three-dimensional shape by fitting together horizontal pipes 131 and vertical pipes 132. The upper end frame part 110 and the lower end frame part 120 are connected to each other with the intermediate frame part 130 interposed therebetween. The intermediate frame part 130 has a sheet metal frame 133 attached to the rear face thereof, which is in contact with rear end surfaces of the image forming units 10.

The lower end frame part 120 includes a front horizontal pipe 121 and a rear horizontal pipe 122 that are spaced from each other in the front-rear direction, and a left horizontal pipe 123 and a right horizontal pipe 124 that are spaced from each other in the left-right direction. The rear horizontal pipe 122 has a pair of positioning holes 122a (see FIGS. 1 and 10) formed in a lower surface thereof, which are spaced from each other in the left-right direction. The positioning holes 122a are to be engaged with pin members 320 provided on the optional sheet feeder 20. Each pin member 320 is attached to the skeleton frame 200 of the optional sheet feeder 20 along with a positioning aiding member 310. The left horizontal pipe 123 and the right horizontal pipe 124 each have a pair of vibration damping pads 125 attached to a lower surface thereof, which are spaced from each other in the front-rear direction. The vibration damping pads 125 have a thickness slightly greater than a gap formed between the lower end frame part 120 of the image forming apparatus 1 and an upper end frame part 210 of the optional sheet feeder 20.

Figure 4:
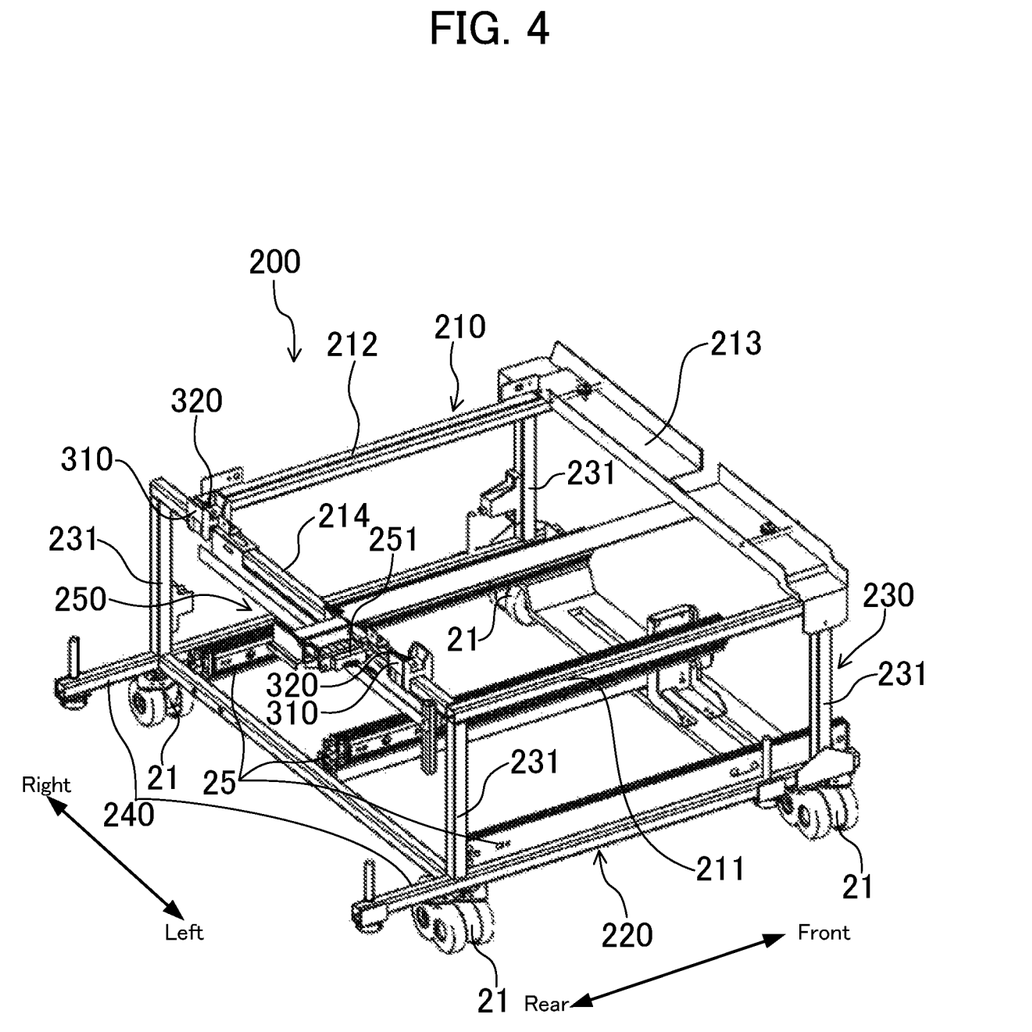
FIG. 4 is a perspective view illustrating a skeleton frame of the optional sheet feeder.

As shown in FIG. 4, the skeleton frame 200 of the optional sheet feeder 20 has an upper end frame part 210, a lower end frame part 220, and an intermediate frame part 230. The upper end frame part 210 and the lower end frame part 220 are each formed in a rectangular shape extending in the left-right direction. The upper face of the upper end frame part 210 constitutes a face to be joined to the skeleton frame 100 of the image forming apparatus 1. The lower end frame part 220 has the aforementioned four casters 21 attached to a lower surface thereof. The lower end frame part 220 has three rail members 25 attached thereto that guide the left and right sheet feed cassettes 23 and 24 of the optional sheet feeder 20 in the front-rear direction. The lower end frame part 220 has a pair of support pipes 240 connected to a rear end thereof, which protrude rearward to support a control box (not illustrated). The intermediate frame part 230 consists of four vertically extending vertical pipes 231 and connects the four corners of the upper end frame part 210 to the four corners of the lower end frame part 220.

The upper end frame part 210 includes a left horizontal pipe 211 and a right horizontal pipe 212 that are spaced from each other in the left-right direction, a reinforcing sheet metal 213 that connects front ends of the left and right horizontal pipes 211 and 212, and a rear horizontal pipe 214 that connects rear ends of the left and right horizontal pipes 211 and 212. The rear horizontal pipe 214 has a pair of pin members 320, each along with a positioning aiding member 310, attached thereto. Note that reference numeral 250 in the drawings denotes a connector supporting mechanism 250 that supports an electrical connector 251 of the optional sheet feeder 20.

Figure 5:
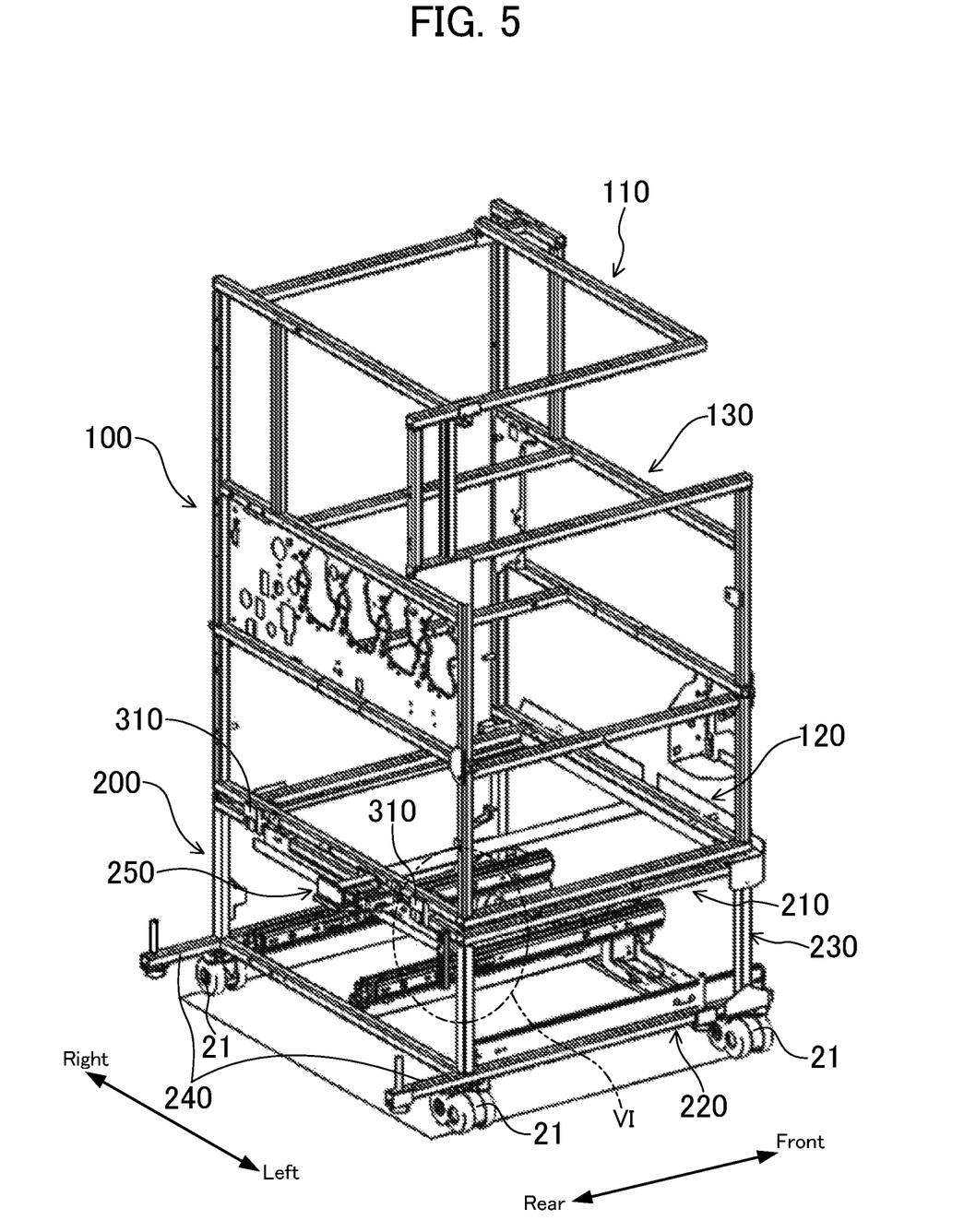
FIG. 5 is a perspective view showing a state where the skeleton frame of the image forming apparatus is installed on the top of the skeleton frame of the optional sheet feeder.
Figure 6:
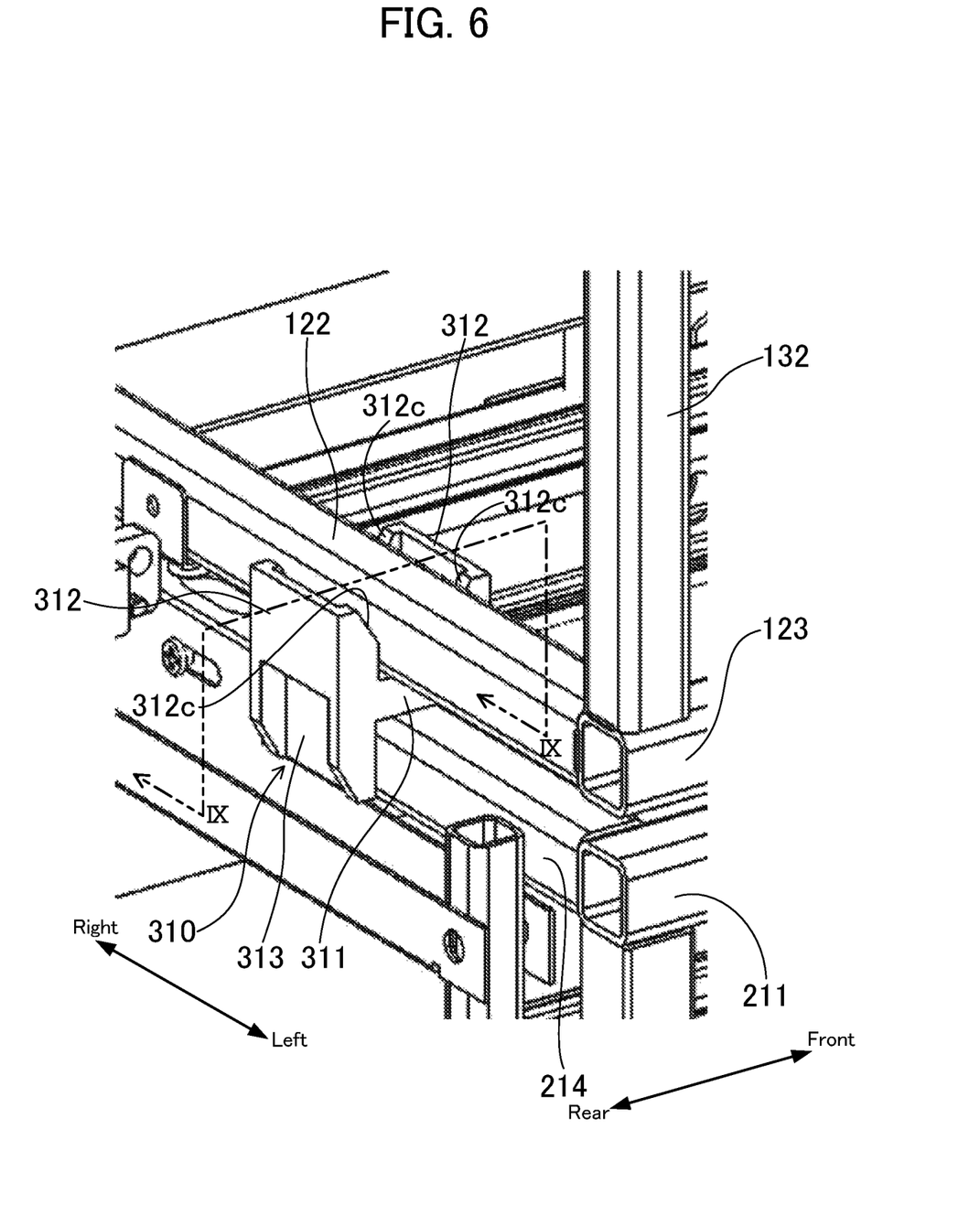
FIG. 6 is an enlarged perspective view of circled region VI in FIG. 5.

FIG. 5 shows a state where the above-described skeleton frame 100 of the image forming apparatus 1 (see FIG. 3) is installed on the top of the skeleton frame 200 of the optional sheet feeder 20 (see FIG. 4). FIG. 6 is an enlarged view of circled region VI in FIG. 5. As shown in these figures, the positioning aiding members 310 are interposed between the skeleton frame 200 of the optional sheet feeder 20 and the skeleton frame 100 of the image forming apparatus 1 and engaged with both of them.

[Configuration of Positioning Aiding Member 310]

Figure 7:
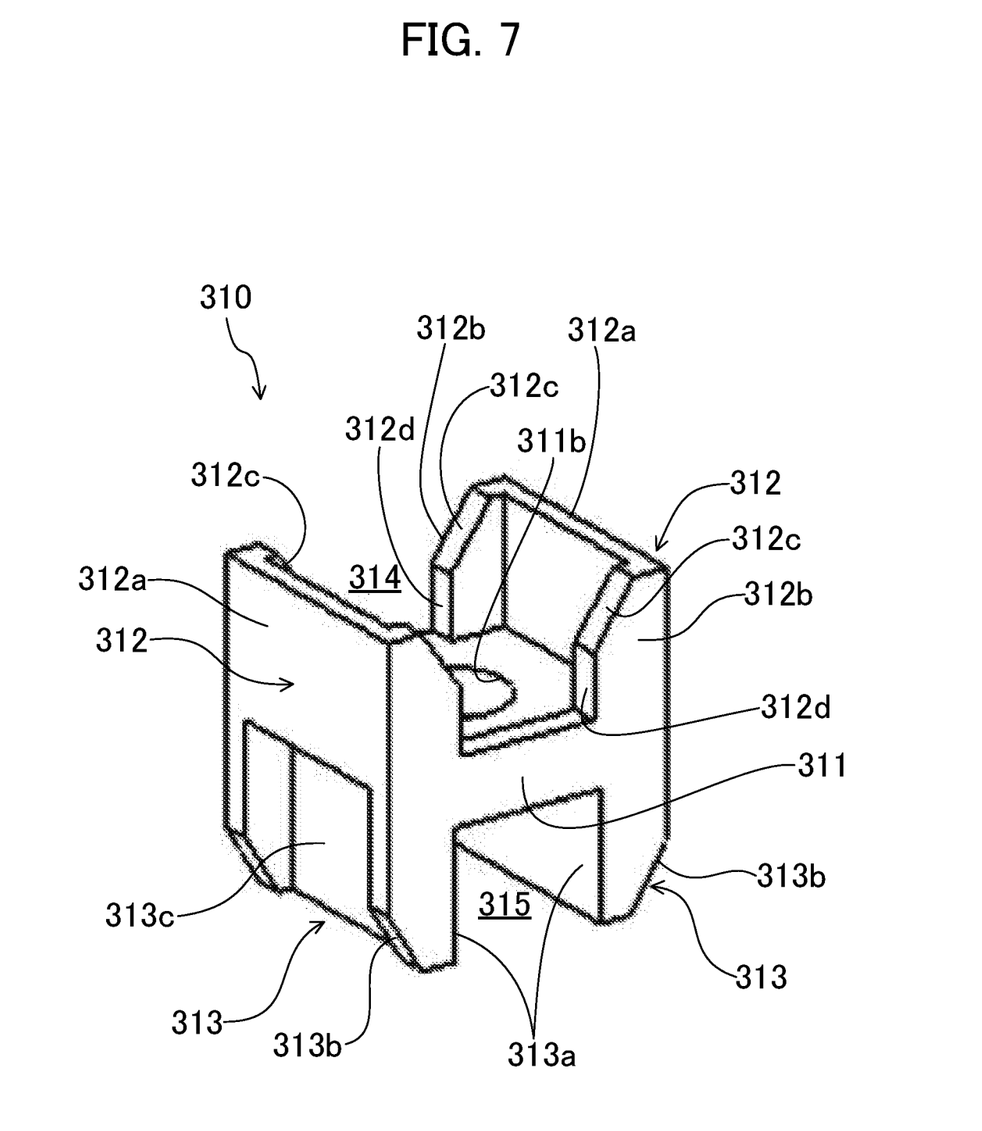
FIG. 7 is a perspective view illustrating a positioning aiding member.
Figure 8:
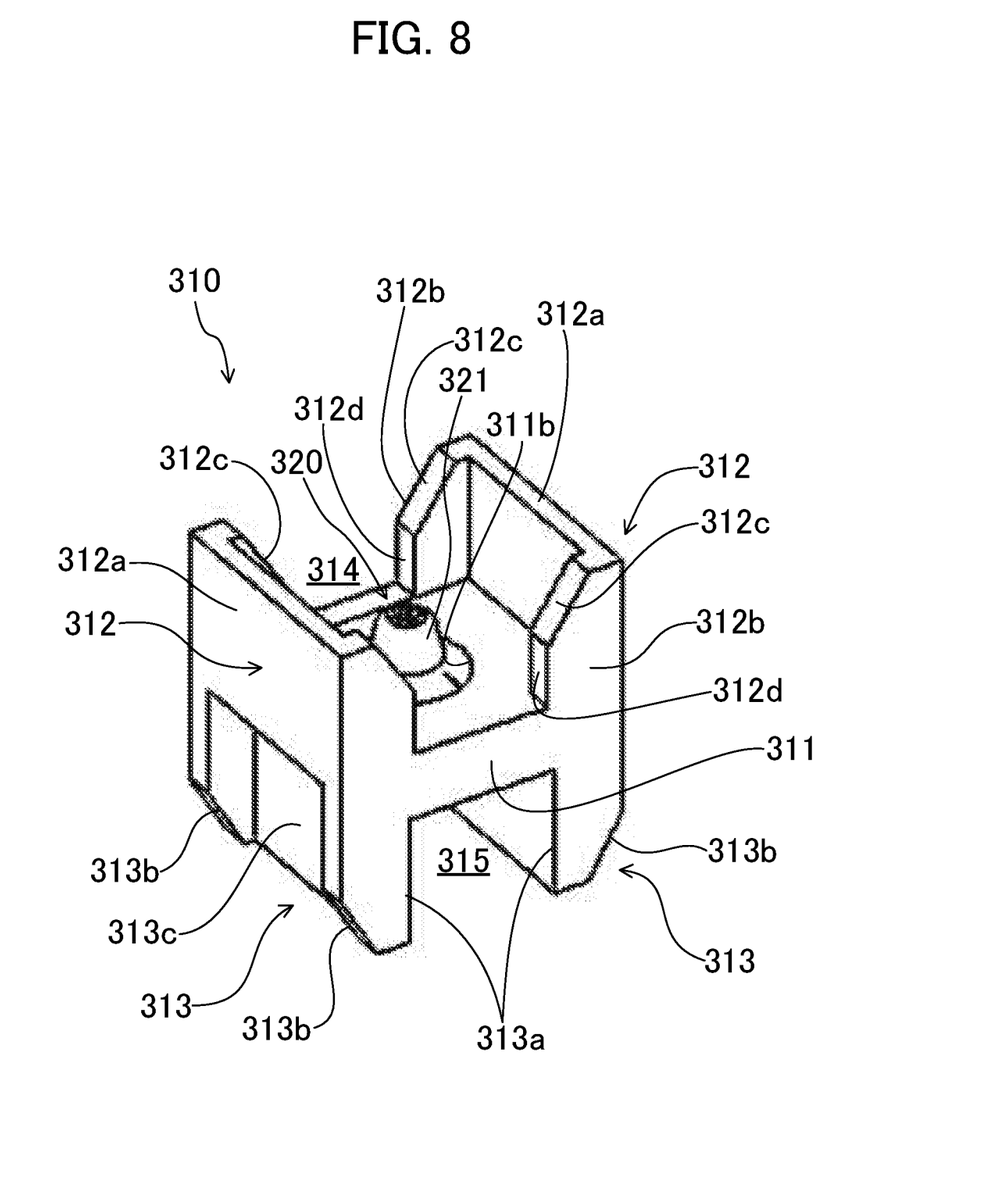
FIG. 8 is a perspective view showing a state where a pin member is mounted on the positioning aiding member.
Figure 9:
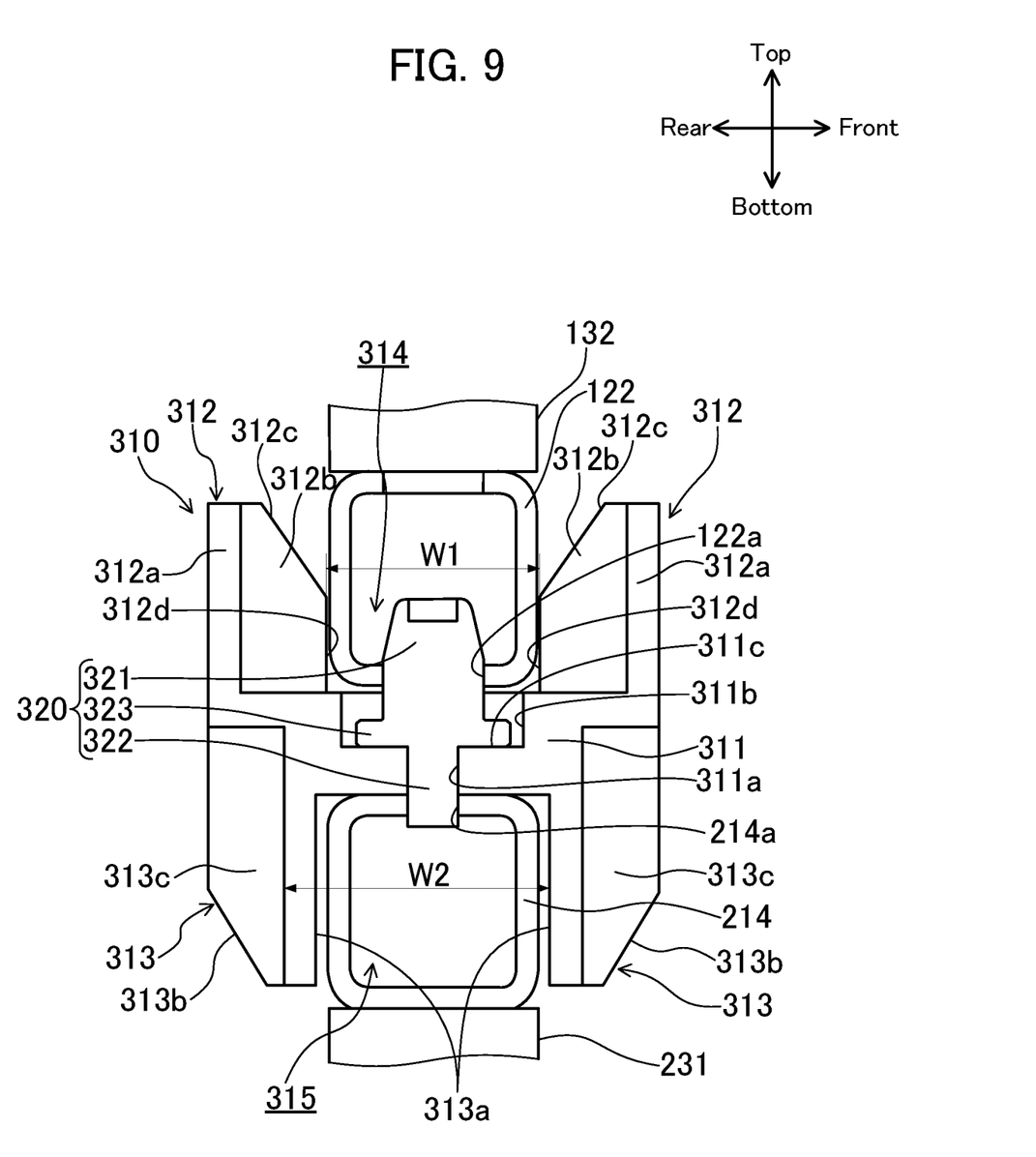
FIG. 9 is a sectional view taken along line IX-IX in FIG. 6.

The positioning aiding member 310 is described in detail with reference to FIGS. 7 to 9. FIG. 7 is a perspective view illustrating the positioning aiding member 310. FIG. 8 is a perspective view showing a state where the pin member 320 is mounted on the positioning aiding member 310. FIG. 9 is a sectional view taken along line IX-IX in FIG. 6. Note that the following description is made with respect to the positioning aiding member 310 in the attached state (the state shown in FIG. 9) unless otherwise indicated.

The positioning aiding member 310 is composed of an integrally molded product made of, for example, a resin material. The positioning aiding member 310 has a resting board part 311, a pair of upward extending parts 312, and a pair of downward extending parts 313.

The resting board part (corresponding to opposed portion) 311 is formed in a rectangular board shape having a thickness in a height direction. The resting board part 311 is opposed to and rests on the upper surface of the rear horizontal pipe 214 of the optional sheet feeder 20 (see FIG. 9). The resting board part 311 has a positioning hole 311a that penetrates in the thickness direction, and a cylindrical hole 311b that connects to an upper end of the positioning hole 311a. A bottom surface 311c of the cylindrical hole 311b is formed by an annular flat surface surrounding the positioning hole 311a and constitutes a seat surface on which the pin member 320 rests.

The pair of upward extending parts 312 are formed to respectively extend upward from front and rear ends of the resting board part 311 and be opposed to each other in the front-rear direction.

Specifically, each upward extending part 312 includes a vertical plate 312a that extends in parallel to the left-right direction (the direction perpendicular to the drawing sheet in FIG. 9), and two rib plates 312b that respectively extend in the front-rear direction along edges of the resting board part 311 from left and right edges of the vertical plate 312a. Thus, each upward extending part 312 is formed to have a square U-shape as viewed from the upper side.

Each rib plate 312b has an inclined surface 312c (example of guide part) formed on the upper end side thereof. The inclined surfaces 312c of the two rib plates 312b located on the front side are inclined downward toward the rear side, while the inclined surfaces 312c of the two rib plates 312b located on the rear side are inclined downward toward the front side. In other words, each of the pair of upward extending parts 312 has inclined surfaces 312c inclined downward toward the inner side of the other upward extending part 312. Between inner side surfaces 312d (vertically extending end surfaces connecting to the inclined surfaces 312c of the rib plates 312b) of the pair of upward extending parts 312, a groove 314 is formed that receives the rear horizontal pipe 122 of the image forming apparatus 1. The groove 314 has a square U-shape with an open upper side as viewed in the left-right direction (the direction perpendicular to the drawing sheet in FIG. 9). The groove 314 is set to have a width W1 slightly greater than the width of the rear horizontal pipe 122.

The pair of downward extending parts 313 are formed to respectively extend downward from the front and rear ends of the resting board part 311 and be opposed to each other in the front-rear direction. Each downward extending part 313 has an inner side surface 313a formed by a vertically extending flat surface. Between the inner side surfaces 313a of the pair of downward extending parts 313, a groove 315 is formed that receives the rear horizontal pipe 214 of the optional sheet feeder 20. The groove 315 is set to have a width W2 slightly greater than the width of the rear horizontal pipe 214.

Each downward extending part 313 has a rectangular recess 313c formed in an outer side surface thereof. Thereby, the thickness of each downward extending part 313 is reduced so that moldability is improved. Further, outer lower corners 313b of the pair of downward extending parts 313 are chamfered for safety.

[Configuration of Pin Member 320]

Next, a configuration of the pin member 320 mounted on the positioning aiding member 310 is described with reference to FIG. 9.

The pin member 320 is composed of a stepped pin including a first positioning pin 321, a second positioning pin 322, and a seating part 323. The first positioning pin 321, the second positioning pin 322, and the seating part 323 are coaxial with each other.

An upper half of the first positioning pin 321 is formed in a tapered shaft shape having a diameter gradually decreasing toward the upper side. A lower half of the first positioning pin 321 is formed in a columnar shape having a constant diameter throughout its vertical extent. The second positioning pin 322 is entirely formed in a columnar shape having a constant diameter throughout its vertical extent. The diameter of the second positioning pin 322 is smaller than the diameter of the lower half (the portion having a constant diameter) of the first positioning pin 321. The seating part 323 protrudes in a flange shape radially outward from a peripheral surface of a lower end of the first positioning pin 321, so that the seating part 323 has a diameter greater than the diameter of the lower half of the first positioning pin 321.

The first positioning pin 321 is fitted in the positioning hole 122a formed in the lower surface of the rear horizontal pipe 122. The second positioning pin 322 is fitted in both the positioning hole 311a formed in the positioning aiding member 310 and the positioning hole 214a formed in the rear horizontal pipe 214 of the optional sheet feeder 20. The positioning aiding member 310 is positioned relative to the rear horizontal pipe 214a of the optional sheet feeder 20 by the second positioning pin 322, and the rear horizontal pipe 122 of the image forming apparatus 1 is positioned relative to the rear horizontal pipe 214 of the optional sheet feeder 20 by the first positioning pin 321 and the second positioning pin 322. The seating part 323 of the pin member 320 rests on the bottom surface 311c of the cylindrical hole 311b formed in the resting board part 311, so that the vertical position of the pin member 320 is regulated.

[Procedure for Installing Image Forming Apparatus 1 onto Optional Sheet Feeder 20]

Next, the operation procedure for installing the image forming apparatus 1 onto the top of the optional sheet feeder 20 is described with reference to FIGS. 10 and 11. Note that, in these figures, outer covers and some components are omitted for easy understanding; however, in actual installation, the skeleton frames 100, 200 are covered with their respective outer covers as shown in FIGS. 2 and 3 and only the places necessary for positioning, such as the places to which the positioning aiding members 310 are to be attached and the places where the positioning holes 214a are formed, are exposed outside the outer covers.

Figure 10:
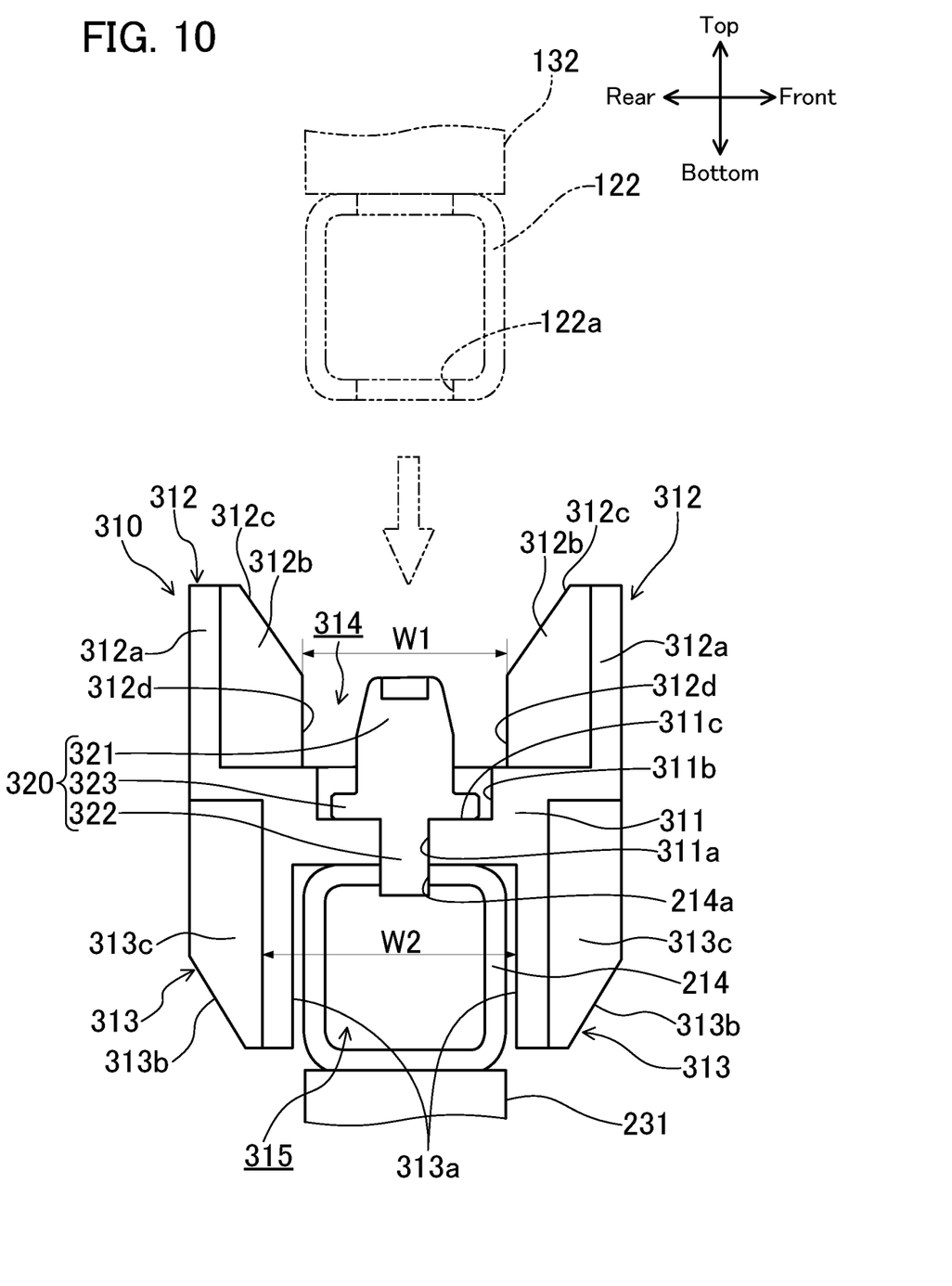
FIG. 10 is a diagram for explaining a procedure for attaching the positioning aiding member to a rear horizontal pipe of the optional sheet feeder.

As shown in FIG. 10, an operator first attaches two positioning aiding members 310 (only one shown in FIG. 10) to the rear horizontal pipe 214 of the optional sheet feeder 20 with a space between the positioning aiding members 310 in the left-right direction. Thereafter, the operator adjusts the positions of the positioning aiding members 310 so that the positioning holes 311a of the positioning aiding members 310 respectively align with the left and right positioning holes 214a formed in the rear horizontal pipe 214. Thereafter, the operator sticks the second positioning pins 322 of the pin members 320 into both the positioning holes 311a and the positioning holes 214a, thereby positioning the positioning aiding members 310 relative to the rear horizontal pipe 214 such that the positioning aiding members 310 are unable to move in the front-rear direction and the left-right direction.

Subsequently, the operator lifts up the image forming apparatus 1 and fits the left and right positioning holes 122a formed in the rear horizontal pipe 122 of the skeleton frame 100 of the image forming apparatus 1 onto the first positioning pins 321 of the left and right pin members 320. In this operation, if the rear horizontal pipe 122 of the image forming apparatus 1 deviates to the front or rear side from a target position, the rear horizontal pipe 122 is brought into contact with the front or rear inclined surfaces 312c of the positioning aiding members 310 and is moved obliquely downward along the inclined surfaces 312c. Thus, the rear horizontal pipe 122 of the image forming apparatus 1 is guided by the inclined surfaces 312c such that the positioning holes 122a of the rear horizontal pipe 122 approach the first positioning pins 321 of the pin members 320. By way of example, the rear horizontal pipe 122 as deviating to the front side from to a correct installation position is shown by solid lines in FIG. 11. In this case, the rear horizontal pipe 122 moves obliquely downward (in the direction indicated by a dashed and double-dotted line arrow in FIG. 11) due to gravity in a state of being in contact with the rear inclined surfaces 312c, and eventually reaches the correct installation position indicated by the dashed and double-dotted line in FIG. 11.

[Operational Effects]

Figure 11:
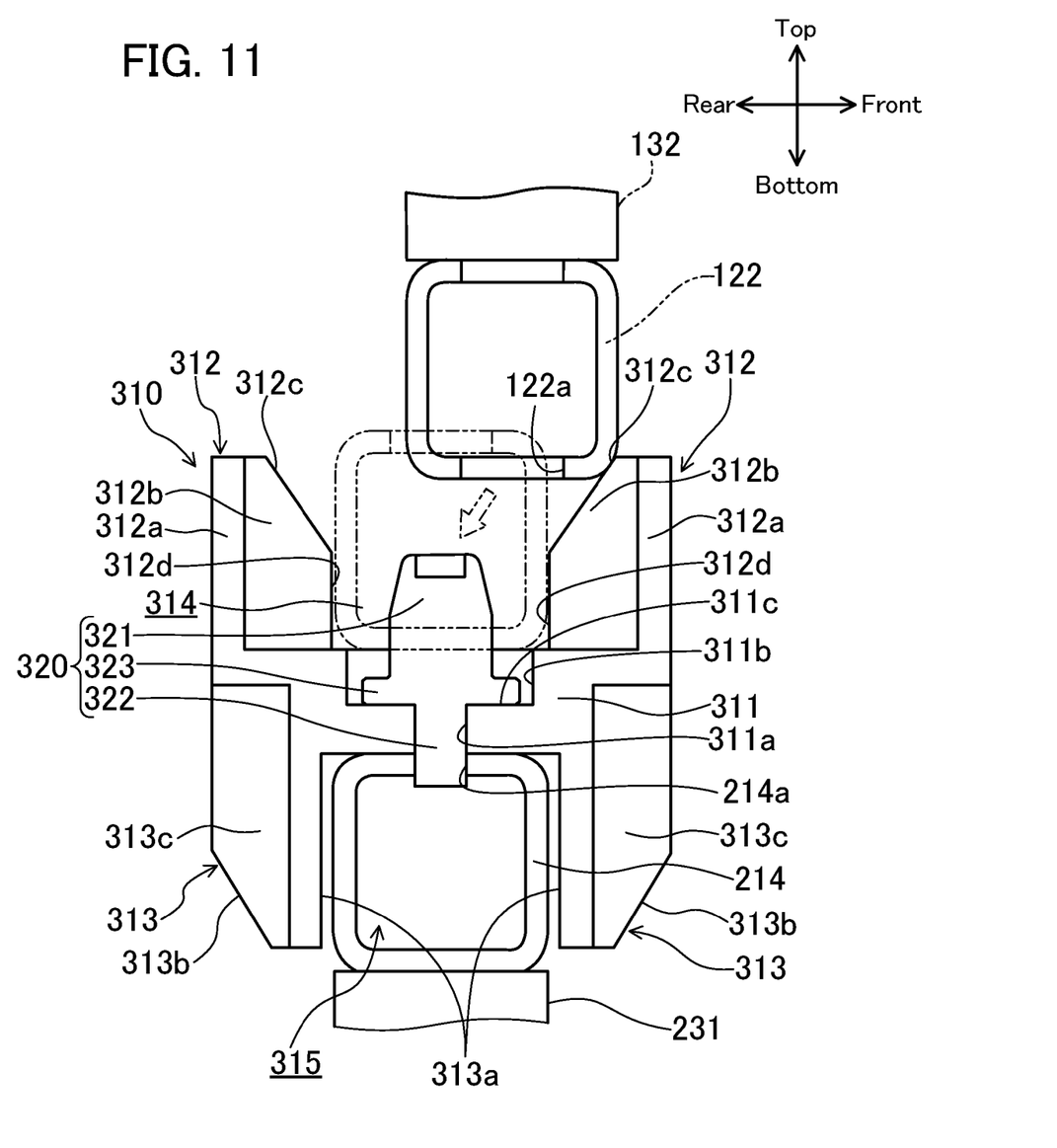
FIG. 11 is a diagram for explaining how a rear horizontal pipe of the image forming apparatus is guided to a correct installation position by the positioning aiding member.

As described above, the positioning aiding member 310 in this embodiment has four inclined surfaces 312c that, when the skeleton frame 100 of the image forming apparatus 1 is installed onto the top of the skeleton frame 200 of the optional sheet feeder 20, guide the rear horizontal pipe 122 of the image forming apparatus 1 such that the positioning holes 122a formed in the lower surface of the rear horizontal pipe 122 of the image forming apparatus 1 approach the first positioning pins 321 of the pin members 320 as viewed in the extending direction of the rear horizontal pipe 214 of the optional sheet feeder 20 (as viewed in the direction perpendicular to the drawing sheet in FIG. 11).

In this configuration, as described above, the rear horizontal pipe 122 of the image forming apparatus 1 is guided by the inclined surfaces 312c of the positioning aiding members 310 such that the positioning holes 122a of the rear horizontal pipe 122 approach the first positioning pins 321 of the pin members 320. Therefore, when installing the image forming apparatus 1 onto the optional sheet feeder 20, the operator is able to easily engage the positioning holes 122a formed in the bottom surface of the mage forming apparatus 1 with the first positioning pins 321 even when the operator is not able to see the positioning holes 122a. This facilitates positioning between the image forming apparatus 1 and the optional sheet feeder 20, so that the burden of the operator is reduced.

Further, the positioning aiding member 310 has the groove 314 for receiving therein the rear horizontal pipe 122 located at the lower end of the image forming apparatus 1, and the four inclined surfaces 312c of the positioning aiding member 310 are configured such that two pairs of front and rear inclined surfaces 312c, each pair consisting of front and rear inclined surfaces 312c opposed to each other with the groove 314 therebetween, are arranged with a space therebetween in the left-right direction. Further, the front and rear inclined surfaces 312c in each pair are formed to be inclined downward toward each other's inner side.

With this configuration, the rear horizontal pipe 122 of the image forming apparatus 1 can be guided to the correct position when the position of the rear horizontal pipe 122 deviates to the front or rear side from the correct position. Further, in this configuration, the space between the front and rear inclined surfaces 312c is relatively wide near their upper ends since they are inclined downward toward each other's inner side. This ensures that, when there is a deviation in the position in the font-rear direction of the rear horizontal pipe 122, the rear horizontal pipe 122 is brought into contact with the front or rear inclined surfaces 312c and guided to the correct position.

The positioning aiding member 310 has the resting board part 311 and the pair of left and right upward extending parts 312, the resting board part 311 rests on the upper surface of the rear horizontal pipe 214 of the optional sheet feeder 20 and has the positioning hole 311a for fitting the second positioning pin 322 therein, and the pair of left and upward extending parts 312 extend upward from the resting board part 311 and are opposed to each other with the positioning hole 311a therebetween. The left upward extending part 312 has two of the inclined surfaces 312c formed thereon and the right upward extending part 312 has the remaining two inclined surfaces 312c formed thereon.

This configuration enables the positioning aiding member 310 to be formed in a simple shape. Therefore, molding failure is unlikely to occur in resin molding of the positioning aiding member 310.

The positioning aiding member 310 further has the pair of downward extending parts 313 that extend downward from the resting board part 311 and are opposed to each other with the rear horizontal pipe 214 of the optional sheet feeder 20 therebetween.

With this configuration, if the positioning aiding member 310 is rotated around an axis of the pin member 320 or is tilted in the front-rear direction, the pair downward extending parts 313 are bought into contact with the rear horizontal pipe 214 of the optional sheet feeder 20 so that motion of the positioning aiding member 310 is regulated. This prevents the inclined surfaces 312c's function of guiding the rear horizontal pipe 122 from being disturbed by such rotation or tilt of the positioning aiding member 310.

Further, in this embodiment, the first positioning pin 321 and the second positioning pin 322 are arranged coaxially with each other and integrated with each other as one pin member 320.

This configuration reduces the number of parts so that the manufacturing cost is reduced. Further, this configuration enables the positioning aiding member 310 to have only one positioning hole 311a formed therein so that the positioning structure 300 is simplified.

Other Embodiments

Figure 12:
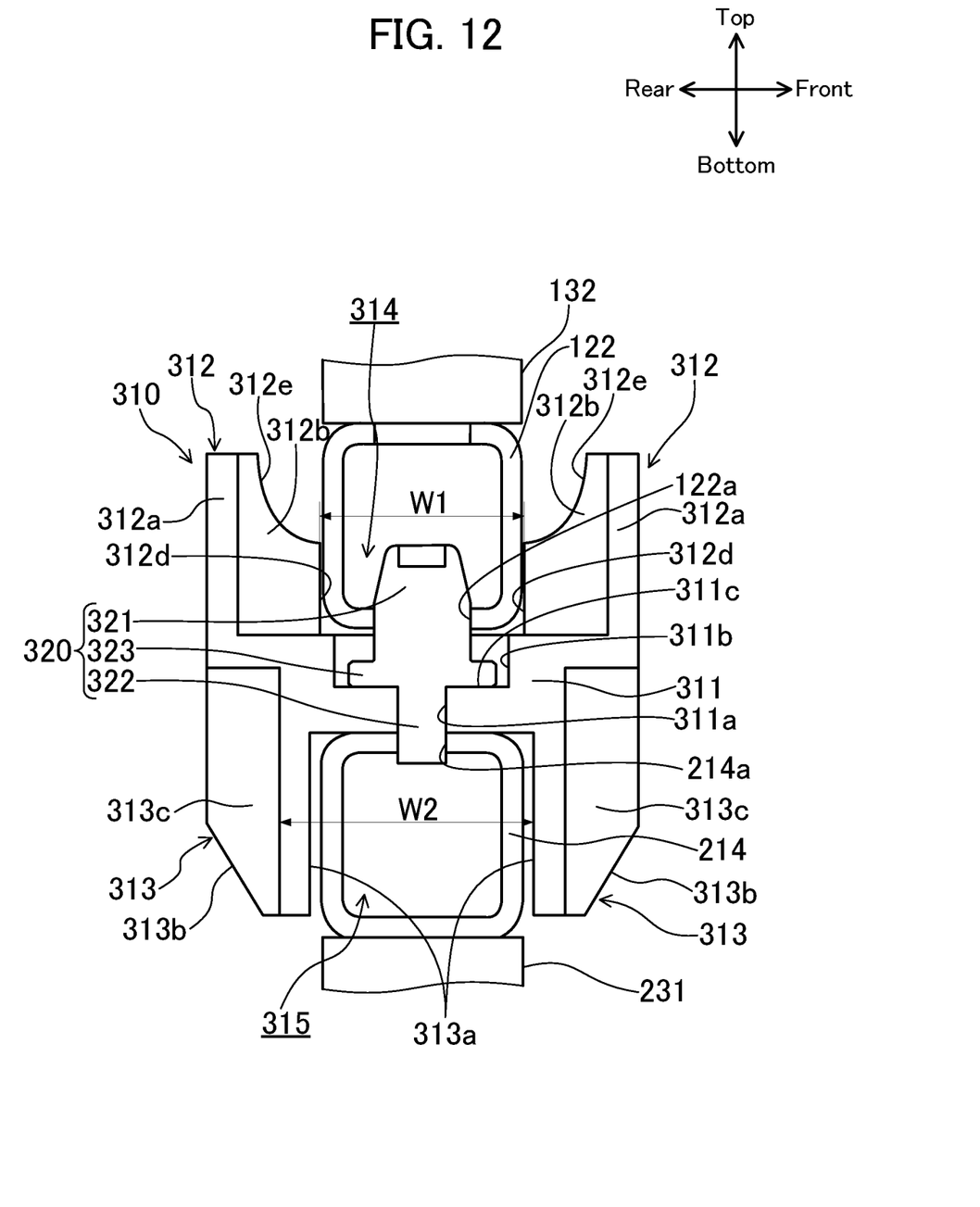
FIG. 12 illustrates another embodiment of the present disclosure correspondingly to FIG. 9.

In the above-described embodiment, the guide part provided on the positioning aiding member 310 is configured by the inclined surfaces 312c. However, the present disclosure is not limited thereto. For example, as shown in FIG. 12, the guide part may be configured by arcuate surfaces 312e having a slope becoming gentler toward the lower side. This configuration enables the rear horizontal pipe 122 to be guided gently along the arcuate surfaces 312e, so that the shock in fitting positioning hole 122a of the rear horizontal pipe 122 onto the first positioning pin 321 of the pin member 320 is reduced.

In the above-described embodiment, the positioning structure 300 has the inclined surfaces 312c as the guide part arranged such that two inclined surfaces 312c are provided on each of the front and rear sides of the pin member 320. However, the number and arrangement of the inclined surfaces 312c are not limited thereto. The inclined surfaces 312c may be provided on only either one of the front and rear sides of the pin member 320. The total number of the inclined surfaces 312c is not limited to four and may be one or may be three or more.

In the above-described embodiment, the first positioning pin 321 and the second positioning pin 322 are integrated with each other as the pin member 320. However, the present disclosure is not limited thereto. The first positioning pin 321 and the second positioning pin 322 may be formed separately and arranged at different positions from each other. In such a case, for example, the positioning aiding member 310 can be formed to have a positioning hole for the first positioning pin 321 and a positioning hole for the second positioning pin 322 separately.

In the above-described embodiment, the first positioning pin 321 and the second positioning pin 322 are formed separately from the positioning aiding member 310. However, the present disclosure is not limited thereto. The first positioning pin 321 and the second positioning pin 322 may be formed integrally with the positioning aiding member 310. In such a case, in view of securing strength, it is preferred that the positioning aiding member 310 is made of a metal material.

In the above-described embodiment, the image forming apparatus 1 is a multifunction peripheral (MFP). However, the image forming apparatus 1 is not limited thereto and may be, for example, a copying machine, a printer, or a facsimile.

What is claimed is:

1. A positioning structure between a sheet feeder and an image forming apparatus to be installed onto a top of the sheet feeder, the image forming apparatus having a skeleton frame including a horizontal beam at a lower end thereof, the horizontal beam having a positioning hole formed in a lower surface thereof, the sheet feeder having a skeleton frame including a horizontal beam at an upper end thereof, the horizontal beam having a positioning hole formed in an upper surface thereof, the positioning structure comprising:

a positioning aiding member attached to the horizontal beam of the sheet feeder and having a positioning hole formed at an opposed portion thereof opposed to the horizontal beam of the sheet feeder;

a first positioning pin coupled with the positioning aiding member and configured to engage with the positioning hole formed in the horizontal beam of the image forming apparatus; and a second positioning pin fitted in both the positioning hole formed in the horizontal beam of the sheet feeder and the positioning hole of the positioning aiding member to position the positioning aiding member relative to the horizontal beam of the sheet feeder, wherein the positioning aiding member has a guide part configured to, when the image forming apparatus is installed onto the top of the sheet feeder, guide the horizontal beam of the image forming apparatus such that the positioning hole formed in the lower surface of the horizontal beam of the image forming apparatus approaches the first positioning pin coupled with the positioning aiding member as viewed in an extending direction of the horizontal beam of the sheet feeder.

2. The positioning structure of claim 1, wherein:

the positioning aiding member attached to the horizontal beam of the sheet feeder has a groove for receiving the horizontal beam of the image forming apparatus therein; and the guide part of the positioning aiding member includes a pair of inclined surfaces opposed to each other with the groove therebetween and inclined downward toward each other's inner side as viewed in the extending direction of the horizontal beam of the sheet feeder.

3. The positioning structure of claim 1, wherein:

the positioning aiding member has a resting board part and a pair of upward extending parts, the resting board part resting on the upper surface of the horizontal beam of the sheet feeder and having the positioning hole for fitting the second positioning pin therein, the pair of upward extending parts extending upward from the resting board part and being opposed to each other with the positioning hole therebetween; and the guide part is formed at an upper end of each of the pair of upward extending parts.

4. The positioning structure of claim 3, wherein the positioning aiding member further has a pair of downward extending parts extending downward from the resting board part and opposed to each other with the horizontal beam of the sheet feeder therebetween.

5. The positioning structure of claim 1, wherein:

the first positioning pin is formed separately from the positioning aiding member;

the first positioning pin has a diameter greater than a diameter of the second positioning pin; and the first positioning pin and the second positioning pin are arranged coaxially with each other and integrated with each other.

* * * * *